(12) United States Patent
Lewis

(10) Patent No.: US 7,798,414 B2
(45) Date of Patent: Sep. 21, 2010

(54) HUMAN AND SCANNER READABLE RADIATION EXPOSURE INDICATOR WITH REACTIVE BARCODE

(75) Inventor: David F. Lewis, Monroe, CT (US)

(73) Assignee: ISP Investments Inc., Wilmington, DE (US)

( * ) Notice: Subject to any disclaimer, the term of this patent is extended or adjusted under 35 U.S.C. 154(b) by 208 days.

(21) Appl. No.: 11/781,500

(22) Filed: Jul. 23, 2007

(65) Prior Publication Data

US 2008/0029606 A1 Feb. 7, 2008

Related U.S. Application Data

(60) Provisional application No. 60/832,563, filed on Jul. 21, 2006.

(51) Int. Cl.
| G06K 19/06 | (2006.01) |
| G06K 7/10  | (2006.01) |
| G06K 7/00  | (2006.01) |
| G06K 19/08 | (2006.01) |

(52) U.S. Cl. ............... 235/491; 235/375; 235/462.01; 235/462.04; 235/494

(58) Field of Classification Search ............... 235/468, 235/491, 494, 462.01, 462.04
See application file for complete search history.

(56) References Cited

U.S. PATENT DOCUMENTS

| 3,507,655 | A | * | 4/1970 | Tamm et al. | ............... 430/139 |
| 3,860,821 | A | * | 1/1975 | Barrett | ............... 250/363.01 |
| 4,680,457 | A | * | 7/1987 | Robertson | ............... 235/470 |
| 5,206,118 | A | * | 4/1993 | Sidney et al. | ............... 430/343 |
| 5,686,725 | A | * | 11/1997 | Maruyama et al. | ............... 250/271 |
| 6,138,913 | A | * | 10/2000 | Cyr et al. | ............... 235/468 |
| 6,471,126 | B2 | * | 10/2002 | Urano et al. | ............... 235/462.27 |
| 2004/0197700 | A1 | * | 10/2004 | Anyumba et al. | ............... 430/270.1 |

* cited by examiner

*Primary Examiner*—Thien Minh Le
*Assistant Examiner*—Tuyen K Vo
(74) *Attorney, Agent, or Firm*—William J. Davis; Thompson Hine LLP

(57) ABSTRACT

The present invention is a reactive bar-code element which is unreadable prior to irradiation and readable after irradiation.

5 Claims, 2 Drawing Sheets

HUMAN AND SCANNER READABLE RADIATION EXPOSURE INDICATOR WITH REACTIVE BARCODE

CROSS-REFERENCE TO RELATED APPLICATIONS

The present application claims the benefit of U.S. Provisional Application Ser. No. 60/832 563, filed on Jul. 21, 2006, which is hereby incorporated by reference in its entirety.

FIELD OF THE INVENTION

The present invention relates to radiation exposure indicators, and more particularly, to human and scanner readable indicator having a reactive barcode element therein.

BACKGROUND OF THE INVENTION

Many medical, food or other products are processed by exposure to doses of high energy radiation. The radiation exposure is used, for instance, to sterilize medical products, extend the shelf-life of foods, inactivate leukocytes in donated blood products or to sexually sterilize certain insect pests. In conjunction with the irradiation of such products it is common to attach human readable irradiation indicators to the products to provide a visual verification that a particular product has passed through the irradiation process and to distinguish irradiated that product from an unirradiated product.

For example, RAD-SURE® irradiation indicators are commonly used to verify irradiation of blood products and STERIN® irradiation indicators are used to verify the irradiation of certain insect pupae subsequently employed in the control of fruit and vegetable pests. Such indicators provide an indication of radiation exposure by employing a radiation sensitive coating in front of human readable indicia. These indicators are printed with the words "NOT IRRADIATED". The word "NOT" is covered by a radiation sensitive coating that is transparent before irradiation, but is opaque after irradiation. Thus before exposure to radiation the indicia read "NOT IRRADIATED" and after irradiation to a minimum dose of radiation the indicia read "IRRADIATED".

In the collection, handling, processing, analysis and approval of blood products for transfusion it is common to trace the blood from donation to transfusion through the use of bar coded information attached to the blood bag. Thus a blood unit receives a unique bar-coded serial number upon donation. That serial number is recorded for all samples taken from that blood unit for testing and remains with the blood product as it moves through the system from processing to transfusion. A data management system records the progress of the blood unit so that at any time it is possible to recall and review all information relevant to that blood product. In addition, many other components and supplies used in the donation-processing-testing-donation cycle are also identified and recorded by bar-coded lot numbers. In the event that some component in the cycle is defective it is possible, through the rigorous recording and use of the bar coded information, to easily trace any blood product that has been in contact with the defective component. Such product can then be removed from the system or quarantined for further investigation before it is transfused to a patient.

With respect to irradiated blood products, it is advantageous to have the lot number of any irradiation indicators identified by bar code. If the function of the irradiation indicator is indicated only by human readable indicia, the data management system requires two inputs—a) scanning the bar-code to record the lot number of the irradiation indicator and; b) manual input from the user that the irradiation indicator does, or does not indicate exposure to radiation.

SUMMARY OF THE INVENTION

In accordance with this invention, there is provided a reactive barcode element which is unreadable prior to irradiation and readable after irradiation. The reactive barcode element can include a radiation sensitive film coating on a reflective film base. In a preferred embodiment, the film coating is over-laminated with a knock-out barcode printed in white on a transparent adhesive film, wherein the knock-out barcode can have characters which are transparent. The element which exhibits a low contrast between the characters in the barcode and the surrounding background, undergoes a substantial change in opacity after irradiation whose change is observable in the transparent knock-out portion of the over-laminate by the strong contrast between the barcode characters and the background which is readily readable by humans or with a barcode scanner. In a preferred embodiment, an element is provided wherein said radiation sensitive film is a mixture of gelatin and the lithium salt of pentacosa-10, 12-dynoic acid, the mixture being approximately a 1:1 weight mixture of gelatin and the acid. In another embodiment, the knock-out barcode is printed onto a transparent adhesive coated label stock. In other embodiments, the knock-out barcode is laminated to the radiation sensitive coating and the reactive barcode is formed from a colorless radiation sensitive polyacetylene monomer.

DETAILED DESCRIPTION OF THE INVENTION

Figure 1:
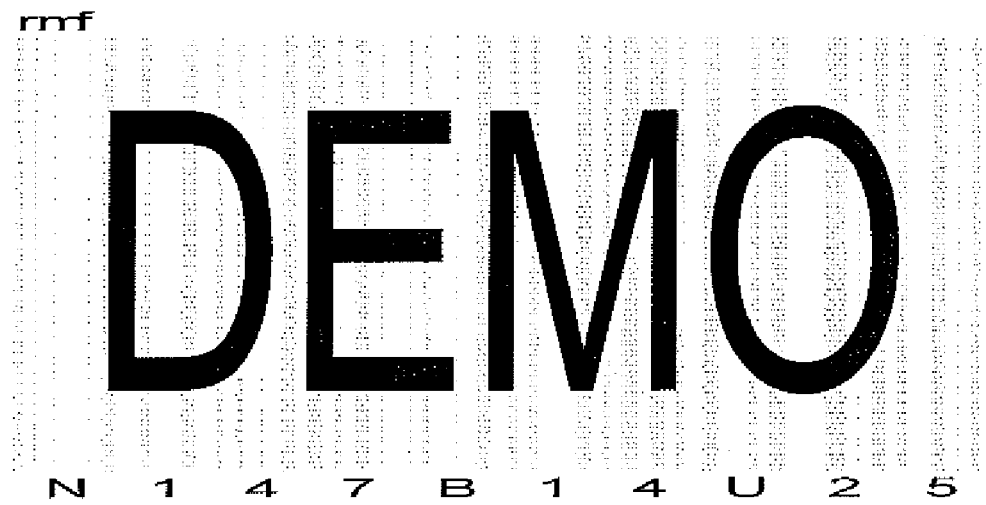
FIG. 1 shows a barcode printed with a colorless radiation sensitive ink.

The current invention seeks to improve the data management system by providing an irradiation indicator that contains radiation sensitive portions that are both human readable and bar-code scanner readable. In particular the invention relates to providing a radiation reactive bar-code in addition to the human readable portion. A radiation reactive bar-code is a bar code that is unreadable until it has been exposed to so minimum dose of radiation.

Such a radiation reactive bar-code may be provided by many means. One way is to print the bar-code with a radiation sensitive ink. To make the bar-code readable it is necessary to provide a particular amount of the active component per unit area. However, it is frequently impractical to print a bar-code with sufficient active component to make the bar-code useful. To provide sufficient active component it may be necessary to slow the printing process to a very slow speed. Another difficulty is in drying very thickly applied inks. Without proper drying the inks are tacky and may bleed or smudge.

One advantageous way to provide the reactive bar-code is to provide a radiation sensitive film coating on a reflective film base. This film coating is then over-laminated with a "knock-out" bar code printed in white on a transparent adhesive film. A "knock-out" bar code is one in which the characters of the bar code are transparent as opposed to the opaque, black characters of a conventional bar code. A radiation reactive bar-code made as described is not readable prior to irradiation because there is very low contrast between the characters in the bar-code and the surrounding background. However, after irradiation the radiation sensitive coating undergoes a profound change in opacity. This change in opacity is revealed in the transparent "knock-out" portion of the over-laminate thereby producing a strong contrast between the bar-code characters and the background that is readily readable with a bar code scanner.

A "knock-out" bar code was printed on a transparent adhesive coated label stock using a QuickLabel QLS-500 thermal printer and an RRT opaque white thermal transfer ribbon. The bar-code was type 128 reading M136A10F25. The label stock had been pre-cut to form individual labels approximately 1"×3" in size. Each individual label was printed with the "knock-out" bar-code. A radiation sensitive film was provided composed of an approximately 20 micron thick layer of 1:1 by wt. mixture of gelatin and the lithium salt of pentacosa-10, 12-diynoic acid coated on 380 gauge Melinex 339, which is an opaque white reflective film base. The adhesive label substrate with the "knock out" bar-code was then laminated to the radiation sensitive coating. In this form the bar-code characters were not readable because the radiation sensitive coating visible through the transparent portion of the "knock out" bar-code was essentially the same color as the background. When the bar-code characters were scanned with an Intermec Scanplus 1800 ST bar code scanner the scanner could not read the code. The label was then exposed to a dose of about 1Gy of x-ray radiation (150 kVp, 0.3 mm Cu filtration). The bar-code was now readily visible because the radiation sensitive coating had turned pale blue. However, despite making more than twelve attempts to read the label with the bar-code scanner, the scanner could not read the code. A second similar label was then exposed to a 2Gy dose from the same radiation source. This time the bar-code was apparent as medium blue characters on a white background and was readily readable with the bar code scanner. The bar code was correctly read as M136A10F25. The bar code was scanned more than a dozen times with 100% success. The process was repeated with labels exposed to doses between 2Gy and 10Gy. Bar-code scans were made with 100% success.

Reactive Barcode

A barcode provides machine-readable information. A barcode is normally comprised of a plurality of areas each of which may exist in one of two states that can be sensed or detected by a barcode reader. A common embodiment of this is seen in a linear barcode printed onto labels attached to consumer articles, e.g. goods in a supermarket. Commonly such barcodes are composed of a series of black or white lines of various widths. However, the lines could be of other colors, so long as the barcode reader could distinguish one color from the other. Viewed as a whole, the width and sequence of the lines provides machine-readable information such as a product identification, price, expiration date, batch number, etc.

As a means of showing that a barcoded article had been exposed to a particular stimulus, one could form the barcode with a material that would react and change appearance when exposed to that stimulus. For example, an ink could be made with a colorless, reactive pigment and that ink printed to form a barcode. When first printed the barcode would not be readable because the barcode reader would be incapable of distinguishing the areas printed with the colorless ink from the areas that had not been printed. However, when the barcode was exposed to a stimulus the reactive pigment would change and become visible to the barcode reader. Thus the ability of the reader to detect the barcode could become evidence that the barcode had been exposed to that stimulus.

In a preferred embodiment, there is provided a reactive barcode to detect exposure to high-energy radiation, e.g. x-rays, gamma rays, electron beam, ultraviolet light, etc. In this embodiment we have formed the barcode from a colorless, radiation sensitive polyacetylene monomer. However, we have found that under many circumstances the barcode can be detected by the barcode reader even before the barcode has been exposed to radiation. In at least some cases we believe the barcode is detectable before exposure to radiation because the surface characteristics of the printed and unprinted areas of the barcode have different reflectivities. The ability to detect the barcode prior to exposure to radiation defeats its purpose.

The foregoing notwithstanding, I have discovered a way to make a reactive barcode reliably unreadable prior to exposure to a stimulus while making the reactive barcode reliably readable after the exposure. This is demonstrated in the following examples.

EXAMPLE 1

A barcode was printed with a colorless radiation sensitive ink as shown in FIG. 1 below. The pale blue background is not used to represent the actual color of the substrate on which the barcode was printed, but rather to illustrate the slight difference in reflectivity between the substrate (pale blue) and the printing which is shown as white. The ability of the barcode reader to detect the barcode was dependent on the angle at which the barcode was scanned. Even though the barcode was barely discernible by eye, the barcode reader could sometimes detect the faint difference between the substrate and the printing and read the barcode.

EXAMPLE 2

Figure 2:
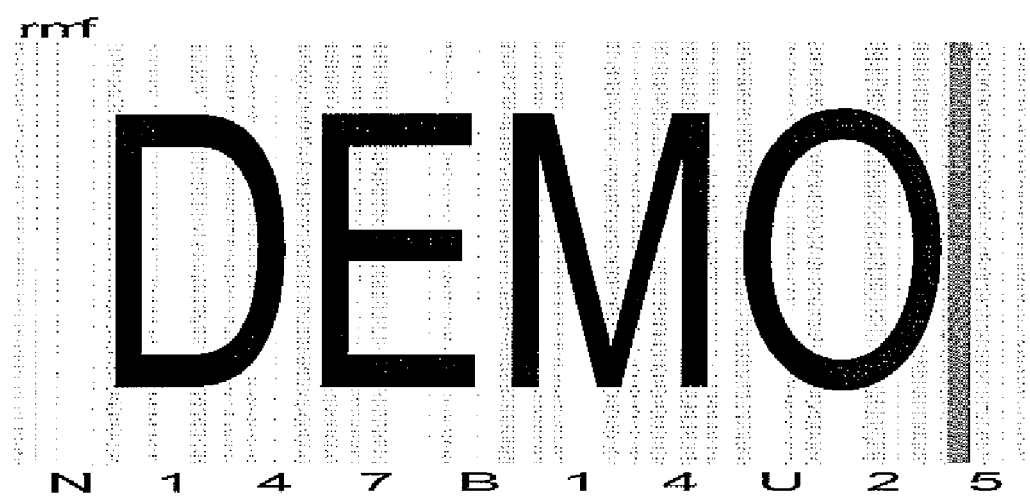
FIG. 2 shows a similar unreadable barcode printed with a colorless radiation sensitive ink prior to exposure.

A barcode was printed with a colorless radiation sensitive ink as shown in FIG. 2 below. The pale blue background is not used to represent the actual color of the substrate on which the barcode was printed, but rather to illustrate the slight difference in reflectivity between the substrate (pale blue) and the printing which is shown as white. In addition one of the printed bars of pattern was overprinted with a color similar to that of the radiation sensitive material after exposure to radiation. When the barcode was scanned, the reader could not interpret the barcode because the dark bar had rendered the code unreadable.

EXAMPLE 3

Figure 3:
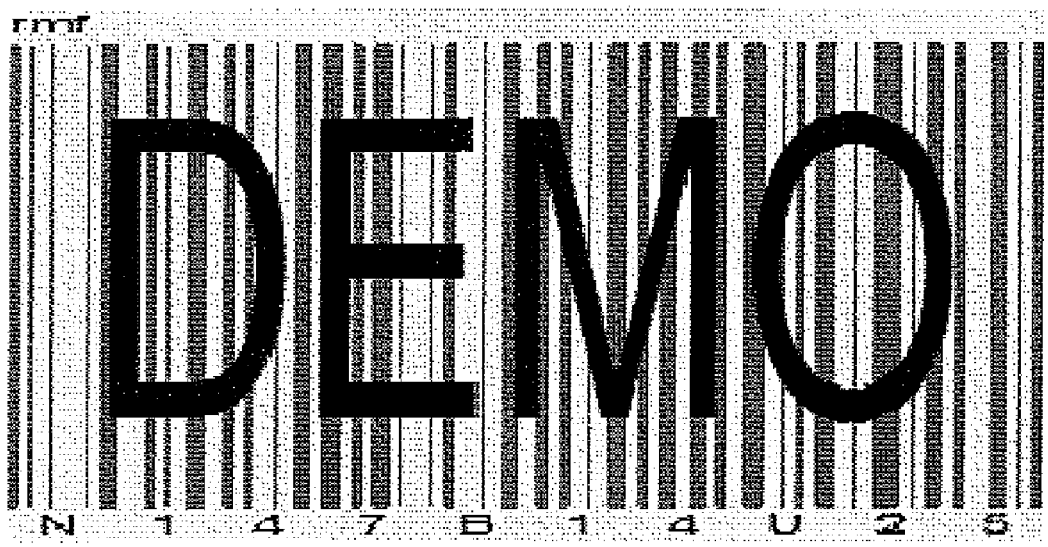
FIG. 3 shows the same barcode after exposure to radiation which is readily readable by humans or a suitable scanner.

The barcode shown in FIG. 2 was exposed to radiation whereupon the radiation sensitive portion of the barcode changed color as shown in FIG. 3. This barcode could be reliably read with the barcode reader.

What is claimed:

1. A reactive barcode element comprising a radiation sensitive film coating on a reflective film base and a knock-out barcode printed in white on a transparent adhesive film on said film coating wherein said barcode element is unreadable prior to irradiation and readable after irradiation, wherein said irradiation comprises high energy radiation; wherein said reactive barcode element which undergoes a substantial change in opacity after irradiation whose change is observable in the transparent knock-out portion of the over-laminate by the strong contrast between the barcode characters and the background which is readily readable by humans or with a barcode scanner.

2. An element according to claim 1 wherein said knock-out barcode has characters which are transparent.

3. An element according to claim 1 wherein said knock-out barcode is printed onto a transparent adhesive coated label stock.

4. An element according to claim 3 wherein said knock-out barcode is laminated to said radiation sensitive coating.

5. A reactive barcode element comprising a radiation sensitive film coating on a reflective film base and a knock-out barcode printed in white on a transparent adhesive film on said film coding wherein the reactive barcode element is unreadable prior to irradiation and readable after irradiation with high energy radiation and said barcode element comprises at least one bar primed with a color similar to that of the radiation sensitive film after exposure to radiation; wherein said reactive barcode element which undergoes a substantial change in opacity after irradiation whose change is observable in the transparent knock-out portion of the over-laminate by the strong contrast between the barcode characters and the background which is readily readable by humans or with a barcode scanner.

* * * * *